3,226,458
METHOD AND APPARATUS FOR CONTINUOUSLY PRODUCING MOLDED ARTICLES AND SECTIONAL SHEETS OF PLASTICS
Roderich Gräff, Burgberg-Villingen, Black Forest, and Ludwig Thoma and Karl Johann Reichl, Weiden, Germany, assignors to Deutsche Tafelglas Aktiengesellschaft Detag, Bavaria, Germany
Filed Dec. 28, 1961, Ser. No. 162,902
Claims priority, application Germany, Dec. 30, 1960, D 35,071
2 Claims. (Cl. 264—90)

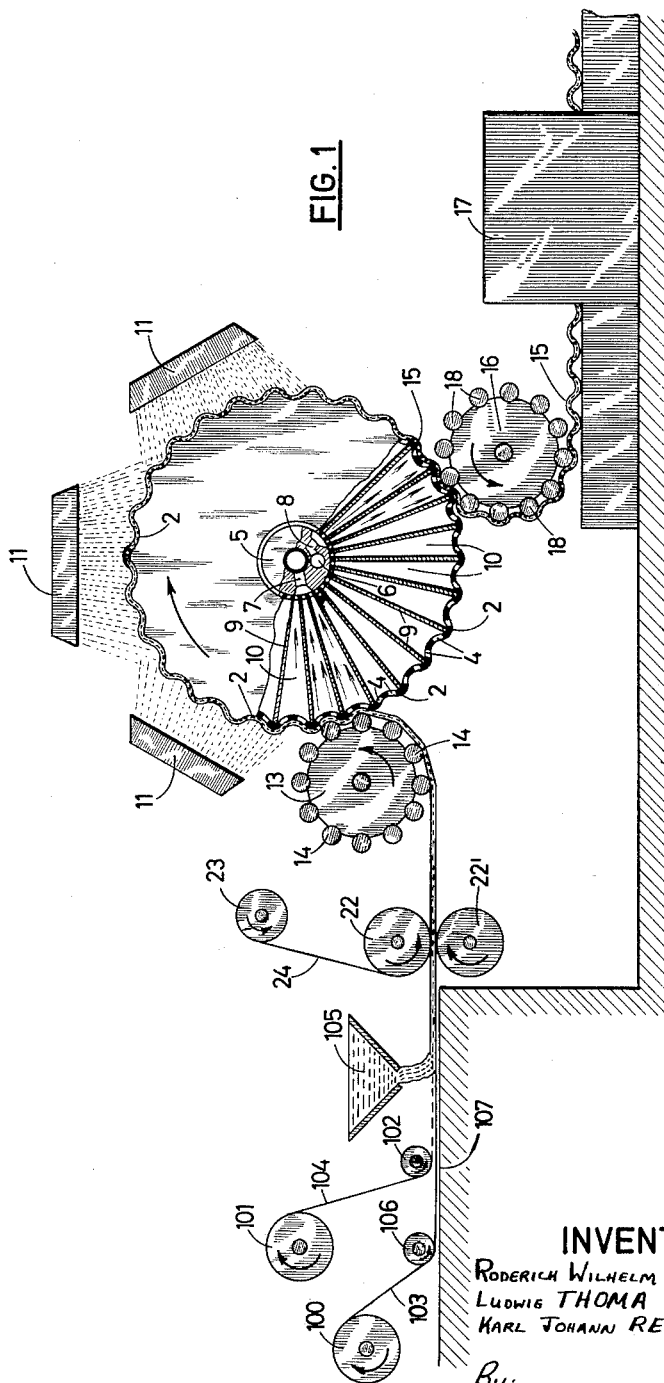

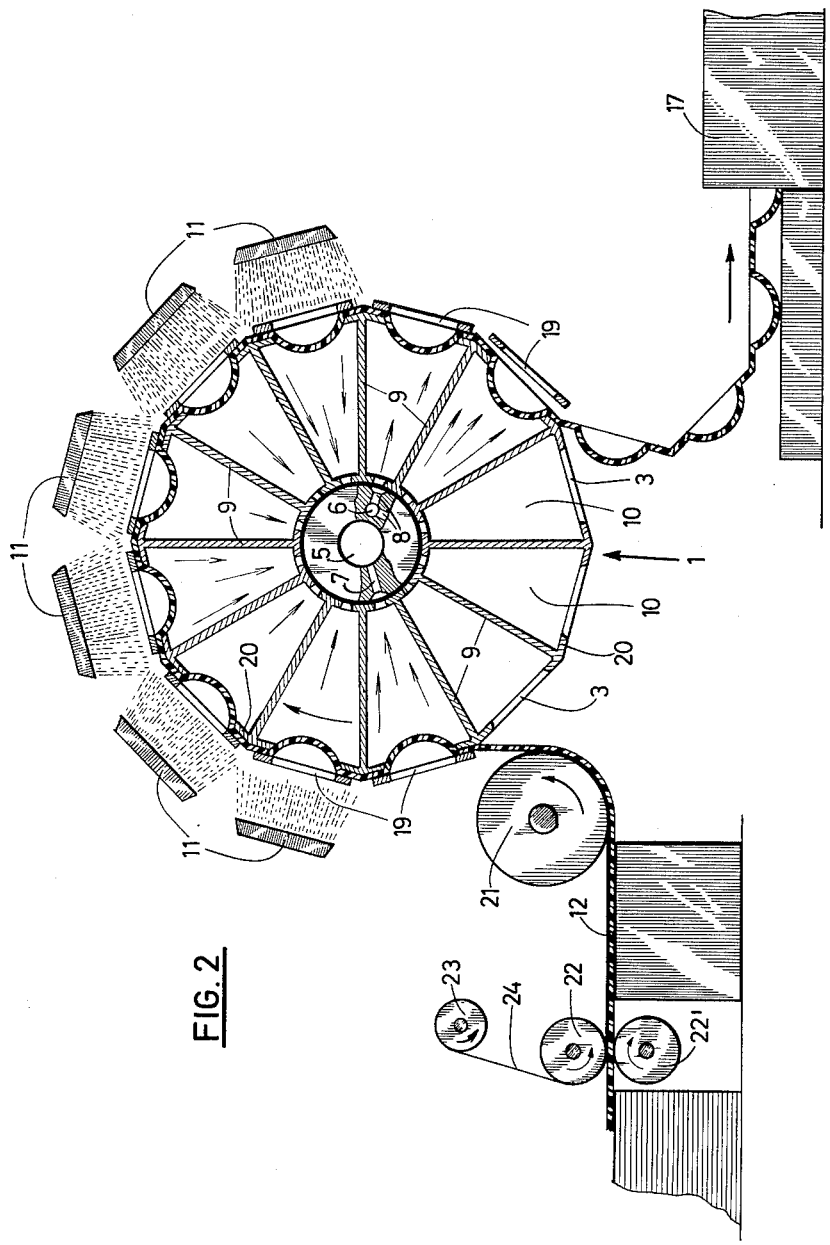

The present invention relates to a method and an apparatus for continuously producing molded articles and sectional sheets of plastics the walls of which are provided with reinforcing inserts, for example, in the form of fabrics or mats of glass or textile fibers or strands.

In the art of plastics it is already known to manufacture fiber-reinforced sheets of plastics which are provided with transverse corrugations in a fully continuous operation by feeding a laminated sheet consisting of a resin-impregnated reinforcing material and upper and lower covering layers thereon continuously between and through a pair of revolving roller belts which engage upon the upper and lower sides of the laminated sheet and take the same along for a certain distance so as to mold the sheet to the desired corrugated shape which will be retained therein permanently after the resin has been cured by the action of heat and the addition of catalysts. This curing process may be started by heating units which are built into the belts or rollers so that the plastic sheet is already precured when leaving the belts and may then be more easily manipulated and treated, for example, by curing it completely in a curing furnace subsequent to the roller belts.

This prior method has one serious disadvantage, namely, that for attaining a smooth surface on the laminated sheet or web and for properly molding the same, it is not only necessary to subject the entire sheet which still contains the resin in a fluid condition to a high tension in its longitudinal direction, but also to apply the roller belts by means of the individual rollers thereof with a relatively high pressure in a vertical direction upon the plastic sheet. As the result hereof, the still fluid resin is strongly forced outwardly toward both sides at the crests of the corrugations, that is, where the rollers first engage so that finally the finished, transversely corrugated sheet varies in thickness in the longitudinal direction. The crests and troughs of the corrugations then contain very little resin and almost nothing but reinforcing material, while the fluid resin which is squeezed out of the crests and troughs collects in the flanks of the corrugations and is subsequently also cured therein. The result of the uneven wall thickness of the corrugated sheet is that the latter possesses an insufficient solidity. One particular disadvantage resulting herefrom is the reduced weather resistance of the corrugated material since the crests and troughs of the corrugations which contain very little resin will be much more severely and quickly affected by the air moisture than the material would be in its original condition, that is, before the corrugations are molded and when the reinforcing material is still uniformly impregnated and covered with resin.

A further disadvantage of the previous method is the fact that there is no longer any possibility to examine the laminated sheet containing the still fluid resin as soon as it is gripped by the roller belts. It is therefore also impossible to effect any subsequent correction of any defects in the formation of the laminated sheet, that is, at a time after the entry of the sheet into the molding apparatus. Such a possibility is, however, very desirable since after the sheet has been passed to the molding apparatus, there may still some air be enclosed in the sheet or irregularities be present in its outer surfaces which, if noticed, could still be expelled or corrected after the sheet has entered the molding apparatus and before it is cured therein. Since the prior method does not permit such an examination of the material, it also results for this reason in products which are often very deficient and a considerable amount of which can only be scrapped.

It is an object of the present invention to provide a new method and a new apparatus for continuously producing molded plastic articles or sectional sheets in a manner so as to overcome all of the above-mentioned disadvantages and to permit all of the requirements resulting from the particular cross-sectional shape of the product to be easily complied with. The method according to the invention is therefore by no means limited to the production of transversely corrugated sheets of plastic materials but may also be employed for producing sheets and articles of plastics of many other cross-sectional shapes.

For attaining the above-mentioned object, the invention is originally based upon the prior method for continuously producing molded articles and sectional sheets of synthetic resin with reinforcing inserts provided in the walls thereof, according to which the resin-impregnated reinforcing material and the covering sheets which are applied upon both sides of the reinforcing material are assembled, preferably in a continuous operation, to form a laminated sheet which is then continuously molded in a molding tool and thereafter cured either as a continuous web or, after the web has been cut, in the form of separate sections or plastic articles.

Proceeding from this prior method, the present invention consists in continuously feeding the laminated sheet toward and upon the peripheral surface of a revolving drum which is provided in accordance with the shape of the desired plastic goods or sheets with projections, recesses, and apertures either behind each other or laterally adjacent to each other, as seen in the course of travel of the sheet, in then molding the laminated sheet material to the desired shape by drawing successive sections thereof which are spaced from each other against these projections and into these recesses or through these apertures by means of a vacuum which is exerted from the inside of the drum through these apertures in the wall of the drum, and in then curing the synthetic resin at least to such an extent as to permit the molded parts to be removed from the recesses or apertures and from the revolving drum without affecting their molded shape and to permit them thereafter to be subjected to further treatments, for example, by finally curing them. The vacuum for molding the individual sections of the laminated sheet material is preferably maintained within the drum over an extent of one-half to three-quarters of the periphery of the drum. The resin-impregnated fibrous material which is drawn by the vacuum into the recesses or through the apertures in the peripheral wall of the drum is then cured by means of catalysts, accelerators, and heat. The heat may be applied to the molded material either from the inside of the drum or more simply from the outside by means of suitable heat radiators. While traveling along and with the drum, the material is cured at least to such an extent that it will retain its molded shape while being conveyed to a final curing furnace. By varying the diameter and the speed of the drum it is easily possible to adjust the length of the precuring treatment in accordance with the respective requirements. For removing the molded precured material at a certain point from the peripheral wall of the drum, the inside of the drum is preferably provided with radial partitions so as to divide it into separate chambers, and the vacuum within the drum is then released in the chambers which have traveled near this point and an air pressure is then applied in these chambers which acts through the apertures in the drum wall upon the molded material and thus loosens and severs the same from the drum.

As already indicated, the method according to the invention is not only designed for the production of transversely corrugated sheets and articles of plastics but also of molded plastic goods of any other desired shape. For carrying out the method successfully, it is advisable to make the covering sheets and the reinforcing inserts of ductile materials which under the action of the vacuum within the drum will be easily molded to the shape of the peripheral wall of the drum and the desired shape of the products. The method according to the invention may thus, for example, be applied for a very simple mass production of transparent cupolas of glass-fiber reinforced polyester resin which are very frequently employed for constructing transparent roofs and domes of buildings. The individual cupolas or cupola sections are then produced by drawing the laminated sheet material by means of the vacuum through larger apertures in the peripheral wall of the drum so as to bulge toward the inside thereof. The radius of curvature of the bulges, that is, the extent to which they project from their base, and thus also their wall thickness may be very simply and accurately predetermined by a suitable control of the vacuum which is applied for producing them. For producing materials or articles of such a shape it is, however, of advantage if the marginal portions of the material around the portions which are to be drawn considerably into the individual recesses in the drum wall or through the drum apertures are clamped tightly against the outer drum surfaces or flanges surrounding the apertures, for example, by means of frames.

The advantages of the new method are self-evident. By employing the outer atmospheric pressure as a molding tool, the resin-impregnated reinforcing material will be uniformly pressed against the wall of the mold so that the plastic article or the sectional sheet to be produced will have a uniform wall thickness. Furthermore, it is easily possible to observe the continuous molding process and to make adjustments therein without interrupting it and, if necessary, to repair damages in the material which may be due to defects or holes in the covering sheets, and while such a repair is still possible, that is, before the resin is cured.

These objects, features, and advantages of the present invention will become more clearly apparent from the following detailed description of the new method and of the preferred apparatus for carrying out this method, as illustrated in the accompanying drawings, in which—

FIGURE 1 shows a diagrammatic illustration, partly in section, of an apparatus for producing transversely corrugated sheets, as seen in the direction of the axis of the drum; while FIGURE 2 shows an illustration similar to FIGURE 1 of an apparatus for producing transparent cupolas or similar products.

Referring first particularly to FIGURE 1 of the drawings, the apparatus for carrying out the inventive method consists of a drum 1 which is rotated in the clock-wise direction. A cover sheet 103 is continuously drawn from a roller 100, and is directed upon table 107 by means of a roller 106. The reinforcing material 104, for instance a glass fibre mat, is continuously drawn from a roller 101 and is subsequently superimposed upon the covering sheet by means of the roller 102. Fluid synthetic resin is discharged from a feeder 105 and is applied upon the reinforcing material 104. A further cover sheet 24 is drawn from a roller 23 and is pressed upon the resin-impregnated reinforcing material 104 by means of a roller 22, with a roller 22′ forming a counter-support therefor. At the same time, rollers 22 and 22′ also serve for expelling any air entrapped in the laminated material, and for removing any excess resin therefrom. The peripheral wall of the drum 1 is of a corrugated shape which is attained by a plurality of uniformly spaced wavy recesses 2. The recessed wall portions of drum 1 are provided with apertures 4 through which during the revolution of the drum at first a vacuum is exerted from the main vacuum line 5 upon the recesses 2, while thereafter a pressure of compressed air is exerted upon recesses 2 which is supplied through the main pressure line 6. The main vacuum and pressure lines 5 and 6 communicate through the channels 7 and 8, respectively, with the apertures 4 in the walls of the recesses 2. Drum 1 is divided by a plurality of radial partitions 9 into separate chambers 10 each of which may have one or more recesses 2 in its peripheral wall portion. When drum 1 revolves, a vacuum is formed in most of the chambers 10 so that according to the embodiments of the invention as shown in the drawings, slightly more than one half of the peripheral surface of the drum will be subjected from the inside to a vacuum, while a smaller part thereof will be subjected from the inside to compressed air. Those chambers 10 which are under a vacuum are indicated in the drawing by arrows pointing toward the axis of the drum, while the chambers 10 which are under pressure are indicated by arrows pointing outwardly from the center of the drum. Above drum 1 the heat radiators 11 are mounted which are required for precuring the molded sheet material on drum 1.

In the apparatus as illustrated in FIGURE 1 for producing transversely corrugated sheets, or an endless web of such a shape, a circular roller support 13 is mounted at the feeding side of drum 1. This roller support 13 is rotatable in the counterclockwise direction, as shown by the arrow, and the rollers 14 thereof which are peripherally spaced from each other at a distance equal to the distance between the individual recesses 2 of the corrugations in drum 1 engage with and feed the sheet 12 toward drum 1, thereby changing the direction of movement of the sheet from the horizontal feeding direction to a direction tangentially to the corrugated wall of drum 1, and then press the sheet alternately into the recesses 2 and then disengage again from the sheet after roller support 13 has rotated for a certain angle. Sheet 12 is thereby corrugated and carried along the wall of drum 1 past the radiators 11, whereby the corrugated sheet is precured on the revolving drum 1. At the outlet or delivery point of drum 1, the corrugated precured sheet 15 after being loosened from the drum by the compressed air which is forced against it from channel 8 is taken off the drum by another roller support 16 which likewise revolves in a counterclockwise direction, that is, in the direction opposite to the rotation of drum 1, and the rollers 18 of which likewise engage into the recesses 4 of the transverse corrugations in sheet 15 and drum 1 and take along the sheet so as to reverse its direction of movement and to feed it toward the final curing furnace 17.

FIGURE 2 illustrates an apparatus for producing a corrugated sheet material of a different, more complicated shape than that according to FIGURE 1. The peripheral surface of drum 1 of this embodiment has a polygonal shape and the outer wall surface of each section is provided with an aperture 3 through which sheet 12 is drawn for a certain distance toward the inside of each chamber 10 in accordance with the strength of the vacuum within each chamber which is connected through the radial channels 7 to the main vacuum line 5. In place of the apertures 3, it is also possible to provide individual dies which may be removably secured to the drum and permit the apparatus to be converted to produce sheets with different kinds of corrugations. During the molding process and while the material is being precured by the heat of the radiators 11, the individual sections thereof are clamped by frames 19 upon the flanges 20 which define the apertures 3. Similarly as in FIGURE 1, sheet 12 is guided to drum 1 by a roller 21 which changes the direction of movement of the sheet and feeds the same at a slight angle toward the drum surface.

In both embodiments as shown in FIGURES 1 and 2, the laminated sheet 12 is fed continuously toward drum 1 by a pair of feed rollers 22 and 22'. Roller 22 serves at the same time for continuously drawing a cover sheet 24 from a roll 23 and for applying it upon the upper surface of the resin-impregnated reinforcing material so as to cover the same. A similar cover sheet 24 may also be applied in the same manner upon the lower side of the reinforcing material. While feeding the laminated sheet 12 toward drum 1, rollers 22 and 22' also expel the air which is enclosed in the sheet and press out and remove any excess of resin from the sheet.

The operation of the apparatus according to FIGURES 1 and 2 is as follows:

The complete laminated sheet 12 consisting of the layer of reinforcing material and the cover sheets is passed either by the roller support 13 according to FIGURE 1 or by the roller 21 according to FIGURE 2 upon the peripheral corrugated surface of drum 1. In the embodiment according to FIGURE 1, sheet 12 is applied by rollers 14 into the recesses 2 of the corrugations of drum 1 where it is pressed upon the walls of the corrugations including those of recesses 2 by the vacuum in chambers 10 acting upon the sheet through the apertures 4. Sheet 1 is thus provided with transverse corrugations similar to those on the drum and during the further rotation of drum 1, the molded sheet is exposed to the heat of radiators 11 whereby the synthetic resin is precured. After passing beyond the last radiator 11, the precured sheet 15 is released from the vacuum in chambers 10 and lifted from drum 1 by the pressure of the compressed air which is then passed into chambers 10, and it is then taken off the drum by the roller support 16 and fed by the latter to the final curing furnace 17 either directly or by suitable conveying means.

The manner of operation of the apparatus according to FIGURE 2 is similar except insofar as the individual sections of the sheet are drawn by the vacuum in chambers 10 through the apertures 3 in the peripheral wall of the drum toward the inside of chambers 10 so as to form transparent cupolas or larger transverse corrugations. For controlling the shape of these cupolas or corrugations during the molding and precuring process, their edges are clamped by frames 19 upon the flanges 20 of drum 1. Frames 19 are intermittently applied upon the sheet section on the first vacuum chamber 10 and they are removed from this section after it has been precured by the heat of radiators 11 and before it is passed to the curing and hardening furnace 17.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A method of continuously making transversely corrugated sheets from a laminate consisting of a layer of fiber-reinforced, liquid state, heat-hardenable resin wrapped by a film, comprising the steps of: advancing the laminate to a rotating drum the surface of which is contoured corresponding to the corrugations to be formed in said laminate, laying said laminate against the said corrugations of said drum, drawing said laminate conformingly against said drum by internal vacuum, applying heat to the laminate, while the latter is kept conformingly against said drum solely by vacuum, until the laminate is partially cured to an extent such as to be dimensionally stable, removing said partially cured laminate from said drum and thereafter completely curing and hardening said partially cured laminate by applying heat thereto.

2. In an apparatus for continuously making transversely corrugated sheets from a laminate consisting initially of a layer of fiber-reinforced, liquid state, heat-hardenable resin covered on both sides by a covering film, in combination a rotating drum the surface of which is contoured corresponding to the corrugations to be formed in the laminate, means for internally applying vacuum to a circumferential surface zone of said drum, means for laying said laminate against the corrugations in said vacuum zone, means for applying heat to partially cure said laminate, to an extent such as to be dimensionally stable, while the latter is kept conformingly on said drum solely by vacuum, means for removing the laminate from said drum beyond said vacuum zone and after such partial curing, and means for applying further heat to the removed laminate to completely cure and harden said laminate.

References Cited by the Examiner
UNITED STATES PATENTS

| | | | |
|---|---|---|---|
| 2,429,482 | 10/1947 | Munters | 156—342 |
| 2,497,212 | 2/1950 | Donofrio | 53—26 |
| 2,644,779 | 7/1953 | Manning | 156—496 X |
| 2,784,763 | 3/1957 | Shorts | 156—201 |

EARL M. BERGERT, *Primary Examiner.*